Sept. 27, 1966  J. PREUDHOMME  3,275,207
METHOD OF AND APPARATUS FOR CUTTING GLASS
Filed April 14, 1965  3 Sheets-Sheet 1

Inventor
JEAN PREUDHOMME

By  Bauer and Seymour
Attorneys

Inventor

JEAN PREUDHOMME

By Bauer and Seymour
Attorneys

Sept. 27, 1966  J. PREUDHOMME  3,275,207
METHOD OF AND APPARATUS FOR CUTTING GLASS
Filed April 14, 1965  3 Sheets-Sheet 3
*Fig. 4*  *Fig. 4a*
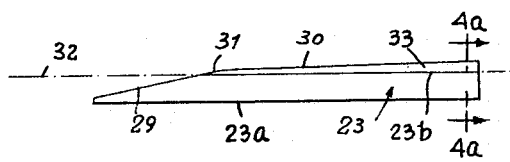 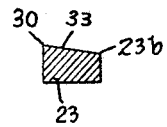
*Fig. 5*
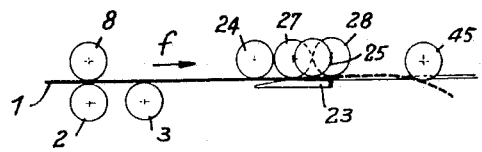
*Fig. 6*
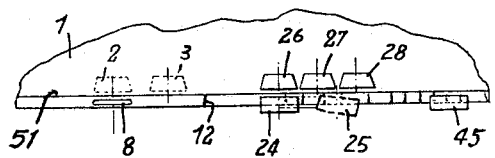
Inventor
JEAN PREUDHOMME
By Bauer and Seymour
Attorneys

United States Patent Office 3,275,207
Patented Sept. 27, 1966

3,275,207
METHOD OF AND APPARATUS FOR
CUTTING GLASS
Jean Preudhomme, Franiere, Namur, Belgium, assignor to
Compagnie de Saint-Gobain, Neuilly-sur-Seine, France
Filed Apr. 14, 1965, Ser. No. 448,134
Claims priority, application France, Apr. 21, 1964,
971,693
21 Claims. (Cl. 225—2)

This invention relates generally to the severing along predetermined lines scored therein, of armored or reinforced glass and, more particularly, to the severing of side bands from a ribbon of reinforced glass while moving continuously in the direction of its length.

Sheet glass is customarily produced in the form of a ribbon of indeterminate length. The glass is drawn from a melting tank and conveyed continuously horizontally past stations where it is rolled, ground, polished, tempered and annealed and finally cut into sections or panels of commercially required sizes.

Due to certain procedures inherent in production, the ribbon must be cut along two parallel lines each closely adjacent a respective side edge thereof, and the side bands delineated thereby between each line and the contiguous edge removed and discarded, leaving a central band of saleable glass having true, smooth and even edges. In the case of armored or reinforced glass, this severing of side bands is rendered more difficult because even although the glass is broken along the aforesaid two lines, each side band is retained attached to the ribbon by the metal filaments of the reinforcement; and these must be broken or sheared before the side bands can be completely removed.

The invention has for a principal object the provision of a method of and an apparatus for the automatic breaking of the metallic reinforcement of a ribbon or armored glass while continuously in motion under conditions where the ribbon has been previously scored along lines delineating side bands and broken along those lines thus leaving the bands attached to the ribbon solely by the filaments of the reinforcement.

In conformity with the foregoing object it is an ancillary object to maintain the ribbon in its plane of movement while the side bands are bent or deflected out of the plane so that the filaments of the reinforcement are ruptured or broken smoothly and continuously, without stopping the orderly process of production.

A further object is the provision of a method and apparatus by which reinforced sheet glass in the form of a continuous flat ribbon moving in the direction of its length, has the usual side bands removed continuously as the ribbon passes a selected station.

Yet another object is the provision of an apparatus which effects removal of the side bands smoothly and efficiently, leaving the central band of saleable glass with smooth and uniform side edges.

Another object is the provision of an apparatus which is versatile in use and readily adapted and adjusted to a wide range of widths and thicknesses of ribbons of glass, as well as to various kinds of strengths of reinforcement.

Still another object is the provision of an apparatus of the kind described, which provides for easy collection and removal of the side band material removed.

Other objects and advantages will become clear to those skilled in the art, after a study of the following detailed description, in connection with the accompanying drawing, wherein there is shown by way of example only, a presently preferred embodiment of the invention.

In the drawings:

FIGURE 4 is a detail view showing in side elevation one of the ramps or inclined planes used for breaking the filaments of the metallic reinforcement;

FIGURE 4a is a cross section taken in a plane identified by line 4a—4a, FIGURE 4;

FIGURE 5 is a view in side elevation showing the arrangement and relative positions of the ramp and several rollers; and FIGURE 6 is a plan view corresponding to FIGURE 5.

Figure 1:
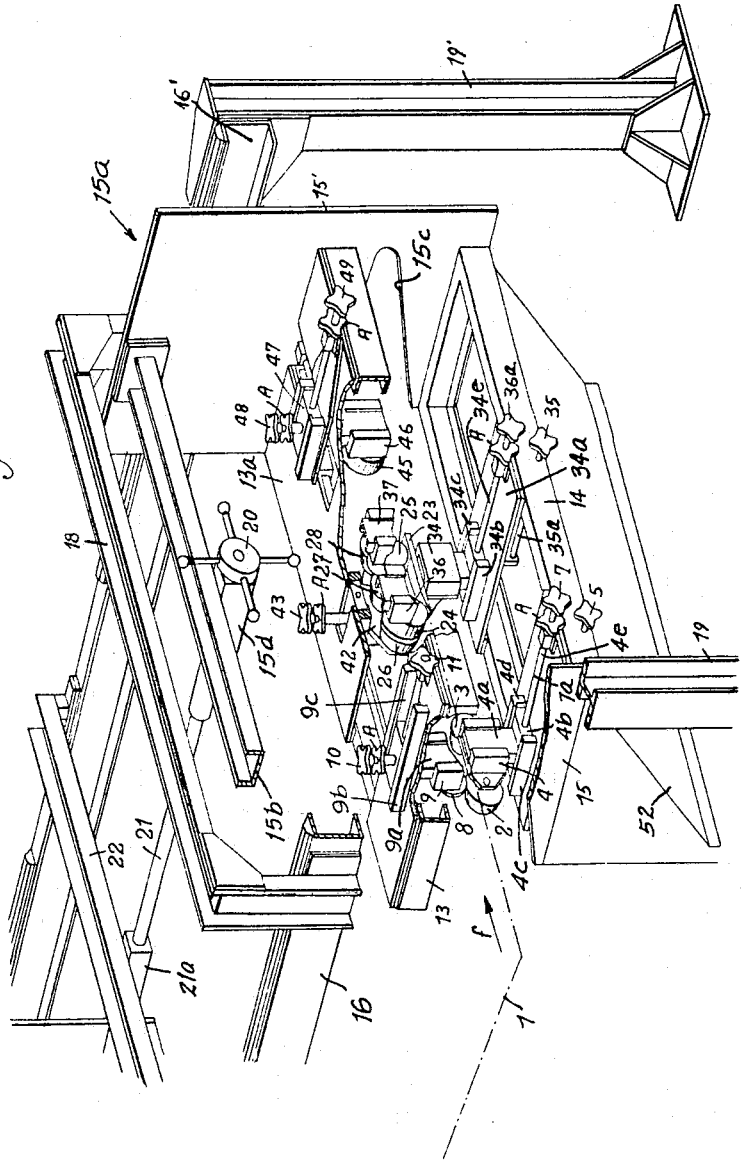
FIGURE 1 is a perspective view showing the portion of the machine for breaking away the metallic reinforcement of a side band along one edge of a ribbon of glass under motion in the direction of its length, parts being broken away to expose details of construction.

FIGURE 1 shows the portion of the machine for breaking away one side band only, of the ribbon of glass 1 moving continuously in the direction of arrow $f$. It will be understood that a band is removed from and along each side edge of the ribbon, that FIGURE 1 shows only that part of the machine for separating the band along the right side edge of the ribbon, and that the part for severing the left side band is an allochiral duplicate of the one shown.

The machine includes means for first opening the longitudinal score line along each side edge, the breaking of the glass along these lines, and the breaking of the metallic filaments of the reinforcement. The devices for effecting these functions operate in close sequence and cooperation so that a description of each is necessary to a full understanding of the invention.

The frame of the machine comprises four vertical legs or posts. Two of these, 19, 19', appear upon FIGURES 1 and 3. The remaining two are not shown but are located at the other end of the frame from that shown in FIGURE 1. The legs are shown in the form of I-beams. Post or leg 19 and its mate, not shown, carry a horizontal channel track 16 fixed to their upper ends. Likewise post 19' and its mate, not shown, carry a second track 16', FIGURES 1 and 3. The tracks are rigidly connected in parallel spaced relation, to extend transversely over and across the ribbon, by a pair of duplicate built-up girders or beams one of which is identified at 18, FIGURES 1, 2 and 3.

The tracks 16, 16' support for guided horizontal translational adjustment therealong, a carrier generally identified at 15a, FIGURE 1. This carrier comprises laterally-spaced vertical parallel plates 15, 15', left and right respectively, rigidly interconnected at their bottom edges by a rectangular frame 14, and at their top portions by a single transverse channel beam 15b. Plate 15 is mostly broken away in FIGURE 1 to reveal parts otherwise obscured thereby. Both plates are notched as at 15c, FIGURE 1, for plate 15, so that the carrier may be transversely adjusted throughout an adequate range with respect to the ribbon of glass.

Figure 2:
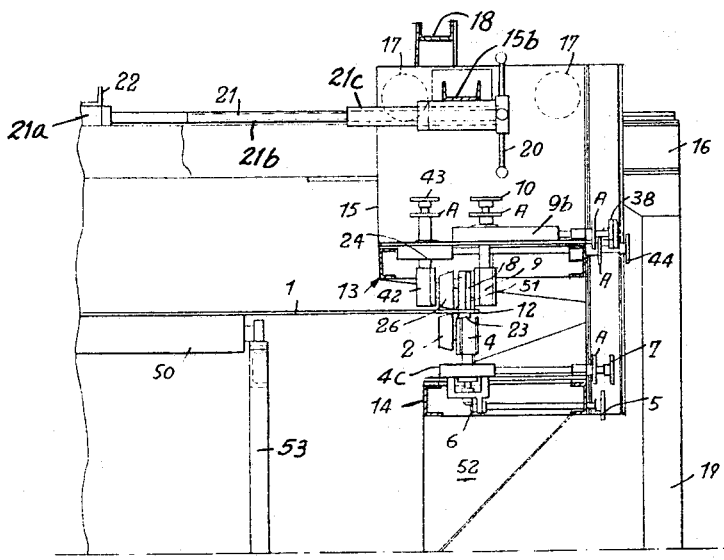
FIGURE 2 is an elevational view looking in the direction of arrow $f$, FIGURE 3, of a form of the invention corresponding to FIGURE 1, wherein the scored line along one side edge of the ribbon is opened at a first station and broken away at a second and subsequent station.
Figure 3:
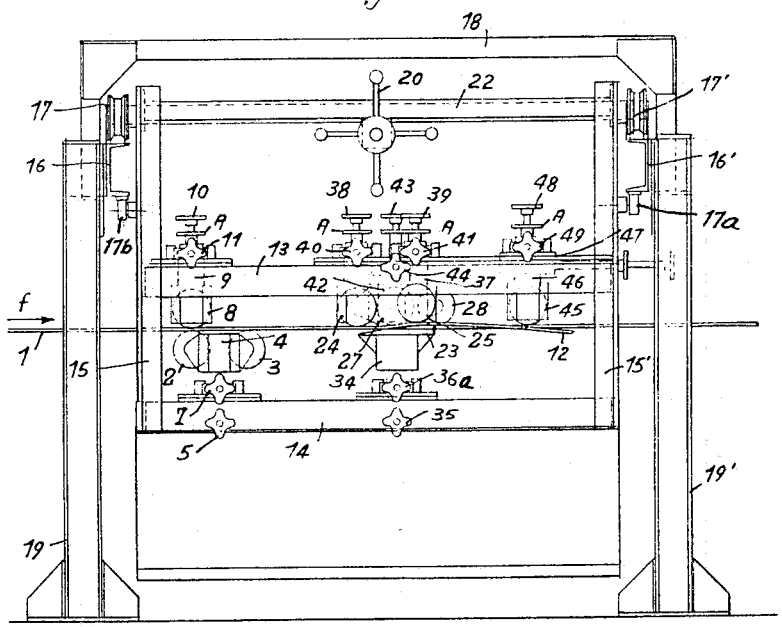
FIGURE 3 is an elevational view looking from right to left, FIGURE 2.

Referring more particularly to FIGURES 2 and 3 it is noted that plate 15' carries a pair of spaced rollers 17'. Likewise, plate 15 mounts a second pair of rollers 17. Each pair is mounted on its respective track, 16, 16' so that the carrier may be horizontally moved in a direction normal to the direction of travel of the ribbon. Auxiliary rollers such as 17a, 17b, carried by the respective plates hold the supporting rollers to their tracks and prevent elevation of the carrier therefrom.

A shaft 21 extends over and transversely across the ribbon and is journaled at its central portion in a bearing 21a carried by beam 22. The ends of this beam are rigidly fixed to the central portions of tracks 16, 16'. The shaft and bearing are so related and constructed that, while the shaft may freely rotate, it is fixed against axial movement in and with respect to the bearing. The ends of the shaft are threaded with threads of opposite hand, as indicated for example at 21b, FIGURE 2, and which engage a threaded sleeve 21c fixed with cross beam 15b. A handwheel 20 is fixed to the extreme right end of the shaft as viewed upon FIGURE 2. Since the threads upon the other end, not shown, of shaft 21 engage a threaded collar identical with 21c but having threads of the opposite hand, turning of the handwheel effects equal and opposite adjustments of the two carriers, so that the rollers carried by each may be properly adjusted transversely of the ribbon in accordance with the known distance separating the side-band-delineating lines score therein.

Frame 14 has a plate 4e fixed thereto at its lefthand side as viewed upon FIGURE 1. This plate carries tracks 4c, 4d, in horizontally spaced relation, to receive between them as base 4b for guided translation. A vertical guide 4a is integrally connected with and upstands from the base and is embraced by a support 4 on which are journaled two rollers 2 and 3, spaced in the direction of travel of the ribbon. The support is vertically adjustable on and along guide 4a by turning of a handwheel 5 fixed with a shaft 5a and having one of two bevel pinions 6 fixed to its end. The other pinion is fixed to a vertical shaft which threadedly engages an aperture in support 4 so that, in an obvious way, turning of handwheel 5 in one direction or the other effects a corresponding vertical adjustment of support 4 and rollers 2 and 3 carried thereby. Base 4b is connected with a threaded shaft 7a having handwheel 7 fixed to its outer end so that by turning of wheel 7 the entire assembly including base, guide, rollers 2, 3, pinions 6 and shaft 5a are horizontally translated in the direction of shaft 7a. The shaft is journaled at its forward end in a bearing carried by frame 14. Thus, rollers 2 and 3 are adjustable vertically and horizontally transversely of the contiguous edge of ribbon 1, moving in the direction of arrow f.

A second frame 13, including horizontal plate 13a is fixed at its respective ends to plates 15, 15' and serves as an additional rigid interconnection between them. A pair of tracks 9b, 9c are fixed to plate 13a in spaced parallel relation and mount between them a unitary base and guide 9a depending through a slot in the plate. A roller support 9 is mounted on 9a for guided vertical translation therealong. This support has a single presser roller 8 journaled on it, with its axis of rotation parallel to the axes of roller 2, 3. Vertical adjustment of the presser roller is effected by turning of handwheel 10 carried by a vertical shaft journaled in the aforesaid base and threadedly engaging support 9. Horizontal translation of the assembly including roller 8, support 9, guide 9a and its base, is effected by turning of handwheel 11 fixed to the forward end of a horizontal shaft. This shaft is journaled at its outer end in a bracket, not shown, carried by one of the tracks such as 9c, and threadedly engages the base integrally connected with guide 9a. From FIGURE 5 it is noted that rollers 2 and 3 are located below ribbon 1 and roller 8 thereabove; and that rollers 2 and 8 have their axes substantially in a common vertical plane. From FIGURE 6 it is seen that rollers 2, 3 are located just inside a line 1a scribed or scored in the ribbon, while roller 8 is just outside the same line. This line delineates one of the side bands 12 of ribbon 1 to be severed and discarded. Thus by proper adjustments of the rollers vertically and horizontally, by the mounting means prevously described, the ribbon is broken along line 1a and the line of breakage is opened as it moves continuously between rollers 2, 3, and upper roller 8.

As is particularly well shown upon FIGURE 1, frame 14 supports at its central part, a horizontal plate 34a. The plate is fixed to and across the frame and has a pair of tracks 34b, 34c secured in spaced parallel relation to its top surface. These tracks receive between them, and guide, a support 34d including a vertical guide on and along which a block 34 is slidable. A horizontal shaft 34e is journaled at its outer end in a bearing fixed to plate 34a, and carries a handwheel 36a. The other end of the shaft is threaded and engages a threaded aperture in the base of support 34a. Since the bearing is constructed to prevent axial movement of the shaft, turning of handwheel 36a effects translation of block 34 and all parts carried thereby, along tracks 34b, 34c.

Means are also provided for effecting precise fine vertical adjustments of block 34 on and along guide 34d. This means may be identical with those previously described for the vertical adjustment of support 4 on and along guide 4a. Consequently it is deemed sufficient to identify handwheel 35 and its shaft 35a. Turning of this handwheel in one direction or the other effects a corresponding vertical adjustment of block 34 and a ramp 23 fixed thereto.

The ramp 23 forms an important feature of the invention and is shown upon FIGURES 1, 2, 3, 4, 4a and 5. Referring mores particularly to FIGURE 4, the ramp has a first flat surface 29 of relatively large acute angle with respect to its planar base surface 23a. This surface merges along a line 31, into a second flat surface 33 of smaller angle with respect to base surface 23a. Dot-dash line 32 indicates the normal position of the lower surface of the ribbon of glass or, more specifically, the side band thereof to be severed, as it approaches the ramp. Comparing FIGURES 4 and 4a it is noted that the upper surface of the ramp from line 31, slopes transversely outwardly and is bounded by two laterally-spaced, non-parallel lines 30 and 32b of which the latter may be substantially in coincidence with the lower surface of the ribbon as indicated at 32. The surface described is thus substantially but not precisely planar. FIGURE 2 shows that in operation, ramp 23 is adjusted to be directly beneath the side band 12 to be severed.

A pair of spaced cylindrical rollers 24, 25 are mounted over ramp 23 in cooperative relation therewith. These rollers are preferably metal with plastic-covered peripheries. Both rollers are supported from and beneath plate 13a, for individual adjustment vertically and horizontally transversely of the edge of the ribbon. Thus, roller 24 is journaled on a horizontal axis on support 36. This support, in turn, embraces a vertical guide which includes a base slidably guided by and between a pair of tracks fixed in spaced relation to the under side of plate 13a. Since the mounting of roller 24 is essentially like that previously described in detail for rollers 2, 3, it is deemed unnecessary to repeat the description. Suffice it to say that referring particularly to FIGURE 3, roller 24 is adjusted vertically by actuation of handwheel 38, and horizontally by handwheel 40.

Ramp roller 25 is similarly mounted and journaled on a support 37, FIGURES 1 and 3. This support is likewise carried by and beneath plate 13a, for vertical adjustment, and for horizontal adjustment in the direction normal to the edge of the ribbon. The mounting may be like those previously described, as for rollers 2, 3, so that it is sufficient to explain that vertical adjustment of roller 25 is effected by turning of handwheel 39, and horizontal adjustment by handwheel 41.

FIGURE 5 shows that in normal operating position, roller 24 is over the upstream end of ramp 23 while roller 25 is located between line 31 and the downstream end of the ramp. FIGURE 6 shows the lateral positions of these rollers, wherein roller 24 lies over band 12 and projects somewhat outwardly of the outer edge thereof. Roller 25 is similarly positioned but, by means not shown, is mounted for an additional adjustment pivotally about a vertical axis passing centrally through its axis of rotation, so that it may be adjustably fixed in the position about as shown by the dotted lines upon FIGURE 6, wherein in its rotation in frictional contact with band 12, it exerts thereon a thrust tending to separate the band laterally from the ribbon.

Three rollers 26, 27 and 28, preferably of frusto-conical form are also of metal covered or rimmed with synthetic plastic material. These rollers are journaled on a single or common support 42 which, like supports 36 and 37, is carried by and beneath plate 13a, through the intermediary of a base mounted for guided translation by and between a pair of spaced parallel tracks extending horizontally in a direction normal to the edge of the ribbon. By means similar in all respects to that described for rollers 2, 3, support 42 is adjusted vertically by actuation of handwheel 43, to correspondingly move all rollers 26, 27, 28 as a unit. The base carrying support 42 is adjusted horizontally along and between its tracks, by actuation of handwheel 44. See FIGURES 1, 2 and 3.

Reverting to FIGURES 5 and 6, it is seen that rollers 26, 27, 28 are positioned in contiguous vertically coplanar relation just inside line 51, and that roller 26 is substantially coaxial with roller 24 and hence does not appear upon FIGURE 5. Thus these three rollers 26, 27, 28 conjointly extend over a longitudinal distance about equal to the corresponding dimension of ramp 23.

A single supplemental roller 45 is located downstream from the ramp. This roller may be cylindrical and of the same construction and size as 24 and 25. Like rollers 24, 25, roller 45 is mounted for vertical and horizontal adjustments, by a construction similar in all respects to that previously described for rollers 2, 3. Thus plate or base 47 is mounted for guided horizontal translation by and between a pair of spaced parallel tracks secured to the underside of plate 13a and includes a vertical guide on and along which a support 46 is guided in vertical adjustment and on which the roller 45 is journaled. Vertical adjustment of the roller is effected in the usual way, by turning of handwheel 48, and horizontal adjustment in the direction normal to the edge of the ribbon, by turning of handwheel 49. Since the mechanism for effecting these adjustments may be like those previously described, particularly for rollers 2 and 3, it is unnecessary to repeat the description.

A hopper 52 is disposed beneath the rollers to catch the fragments of the side band as they are severed and fall. At 50, FIGURE 2 is indicated one of the rollers of the conveyor by which the ribbon is continuously moved in the direction of its length. Posts such as 53 support horizontal beams on which bearings for the conveyor rollers are fixed. As previously explained, all parts shown upon the figures of the drawing are duplicated at the other side edge of the ribbon, and act in the same way, so that both right and left side bands are simultaneously removed.

OPERATION

The two lines one of which is identified at 1a, FIGURE 6, and which delineate the side bands, are scored in the glass by suitable mechanism not shown, located upstream along the conveyor with respect to the invention. Such mechanisms are well known and form no part of the present invention. Suffice it to say that these lines are scored in the ribbon before it reaches rollers 2, 3, and that their distance of separation and the distance of each from the adjacent edge of the ribbon, are precisely known. Handwheel 20 is turned to correspondingly equally and oppositely transversely translate the two carriers of which 15a only is shown, until each of the two sets of rollers such as 2, 3, 26, 27 and 28 lie with their larger diameters just inside a corresponding line such as 51, and the set of rollers 8, 24, 25 and 45 are just outside this line, all as depicted upon FIGURES 2 and 6. Of course, handwheels 5 and 11 are also available to effect a very fine and precise adjustment of the horizontal positions of rollers 2, 3 and 8 with respect to each other and to line 51.

Likewise, precise individual adjustments horizontally, of rollers 24 and 25 relatively to the line may be made by handwheels 40 and 41, respectively, and of rollers 26, 27 and 28 as a unit, by handwheel 44. Vertical adjustments of the several rollers, or group of rollers in the case of 26, 27, 28, may be made by respective handwheels 5, 10, 38, 43 and 48. Each of the handwheels 7, 10, 36a, 43 etc., is shown equipped with a locking wheel A. Since all are alike in construction and function they have been identified by the same reference character. Thus, referring to FIGURE 1 and to wheel 7, its threaded shaft 7a has locking wheel A threaded thereon adjacent its forward bearing. Turning of wheel A against this bearing binds the shaft therein and, in an obvious way, releasably locks it in adjusted position. All other wheels identified by A, operate in a similar way to preserve a selected precise adjustment of the corresponding roller or rollers.

The elevation of the rollers is adjusted by the respective handwheels in such a way that the peripheries of larger diameter of rollers 26, 27, 28, are in contact with the ribbon and maintain it in its own plane of translation during opening of the fissure and breaking of the metallic reinforcement. Simultaneously, ramp 23 is located beneath band 12 and rollers 24, 25 are positioned over the band. The ramp is adjusted in elevation in such a way that the lower surface 32 of band 12 contacts the ramp substantially at or along point or line of intersection 31 of the two surfaces 29 and 30, as shown upon FIGURE 4.

The roller 25 is adjusted in elevation in such a way that it has a separation from the ramp equal to the thickness of band 12. Roller 45 is adjusted in elevation so as to curve or deflect the side band 12 downwardly toward and into hopper 52.

Applicant has discovered that the breakage of the filaments of the reinforcement is effected during the vertical movement of band 12 in the zone located between rollers 24 and 25, and that this breakage is, by proper adjustments of the instrument, so clean as to leave no traces of projecting splinters of filaments on the cut edges of the ribbon. The band fragments as indicated upon FIGURE 6. It may be advantageous to give roller 25 a slight pivotal adjustment about a vertical axis through its axis of rotation, to thereby apply a component force diverting the side band laterally away from the ribbon, after the filaments have been broken. The inclination of surface 33 as previously described promotes and facilitates separation of the band from the ribbon.

While I have described in detail the presently preferred embodiment of my invention, numerous alterations, modifications, substitutions of equivalents and variations in modes of operation will occur to those skilled in the art, after a study of the foregoing disclosure. Hence this disclosure should be taken in an illustrative rather than a limiting sense; and it is my desire and intention to reserve all modifications and substitutions within the scope of the subjoined claims.

While the terms "horizontal," "horizontally," "vertical," "vertically," etc., have been used in the claims, it will be understood that these are for convenience, compactness and accuracy of description only, and that the method and apparatus of the invention are not limited to use in a ribbon of glass moving horizontally. It will be clear that the invention is of utility for example in the case of a ribbon of glass moving vertically in the direction of its length.

Having fully disclosed the invention, what I claim and desire to secure by Letters Patent is:

1. In an apparatus for severing a band of glass from a ribbon of reinforced glass moving in its own plane in the direction of its length, said band being delineated by a line scored in one surface of the glass, parallel with said direction, first means fixed at a first station to engage and break the glass along said line, in passing said station, and second means fixed at a second station downstream of said first station, to move said band out of the plane of the ribbon to thereby break the reinforcement thereof.

2. In an apparatus for severing a band of glass from a ribbon of reinforced glass moving continuously in its own plane, in the direction of its length, and having scored therein a line in its upper surface, parallel with said direction, means at a first station supporting the ribbon adjacent said line, while exerting a downward force on the band to break the glass along said line in passing said first station, and means at a second station downstream from said first station to engage the top surface of the ribbon adjacent said line, while simultaneously elevating said band out of the plane of the ribbon, to break the reinforcement holding the band to the ribbon.

3. The apparatus of claim 2, said second means comprising a fixed ramp having an upper band-contacting surface diverging upwardly with respect to the plane of the ribbon in the downstream direction and in intersecting relation with said plane.

4. The apparatus of claim 3, said upper ramp surface also having a slope laterally downwardly and outwardly away from the ribbon.

5. In an apparatus for severing a side band of glass from a ribbon of reinforced sheet glass moving continuously in its own plane and in the direction of its length, said ribbon having scored in a first surface thereof, a line parallel with said direction and delineating a side band to be severed, first roller means at a first station engaging and supporting the ribbon adjacent said line on the second surface thereof, second roller means at said first station and simultaneously engaging the first surface of the band adjacent said line to continuously break the band along said line and open the resulting fissure therein, and ramp means fixed at a second station downstream from said first station and engaging and thrusting the band out of the plane of the ribbon to continuously break the reinforcement thereof.

6. The apparatus of claim 5, said ramp comprising a substantially planar surface, and means mounting said ramp with said surface intersecting the plane of the ribbon and making an acute angle with said plane outwardly along said direction.

7. The apparatus of claim 6, said last-named means being operable to adjust said ramp vertically and horizontally transversely of said line.

8. In an apparatus for continuously severing a side band of glass from a ribbon of reinforced glass moving horizontally in its own plane and in the direction of its length, a carrier, first and second rollers, first means journaling said first and second rollers on said carrier in contiguous relation for rotation on parallel horizontally coplanar axes normal to said direction and for vertical and horizontal adjustments as a unit, a third roller, second means journaling said third roller on said carrier for rotation on a horizontal axis parallel with and above said first roller, a ramp, third means mounting said ramp on said carrier downstream from said first, second and third rollers, for vertical and horizontal adjustments, and in the vertical plane of said third roller, said ramp having an upper surface intersected by a horizontal plane level with the tops of said first and second rollers, a plurality of contiguous rollers, fourth means journaling said plurality of rollers on said carrier above said ramp and with their axes horizontally coplanar, said plurality of rollers being vertically coplanar with said first and second rollers, and roller means above and vertically coplanar with said ramp to hold the band thereto.

9. The apparatus of claim 8, said first means comprising a common support on which said first and second rollers are journaled, a vertical guide and base mounting said support for vertical adjustment therealong, a pair of horizontal parallel tracks fixed with said carrier and slidably receiving and guiding said base between them for horizontal adjustment, manually operable means to adjust said base and guide along said tracks, and manually operable means to adjust said support on and along said vertical guide.

10. The apparatus of claim 8, a deflector roller, and means journaling said reflector roller on said carrier downstream from said ramp and with its axis parallel with said first and second rollers.

11. In an apparatus for severing side bands of glass from a ribbon of armored glass moving continuously in its own plane and in the direction of its length, a conveyor for so moving the ribbon, a frame including a pair of parallel tracks fixed horizontally across said conveyor and spaced in said direction, first and second carriers each mounted on said tracks for movement therealong at a respective side of said conveyor, means interconnecting said carriers and operable to equally and oppositely adjust the same along said tracks with respect to the center line of said conveyor, means carried by each said carrier to engage and hold the ribbon on said conveyor in its own plane, roller means at a first location on each said carrier for exerting a downward force on the respective side bands in passing said first location, and means carried by each said carrier at a second and downstream location and operable to positively elevate each respective side band out of said plane.

12. The apparatus of claim 11, said last-named means comprising first and second ramps each having an inclined upper surface intersecting and diverging upwardly at an acute angle from said plane in the direction of travel of a ribbon on said conveyor.

13. The apparatus of claim 12, horizontal track means fixed with each said carrier, first and second supports each mounted by a respective one of said track means for guided horizontal movement therealong, first and second blocks each mounted on a respective one of said supports for guided vertical adjustment therealong, each said ramp being fixed to a corresponding one of said blocks, and manually operable means for selectively horizontally adjusting each said support on and along its said track means, and for selectively and vertically adjusting each said block and its ramp, on and along the corresponding one of said supports.

14. In an apparatus for severing reinforced sheet glass while traveling in its own plane and in the direction of its length, a fixed frame, horizontally disposed first and second spaced parallel tracks carried by said frame, a carrier mounted on said tracks for guided translation therealong, a ramp, means mounting said ramp on said carrier for vertical adjustment and for horizontal adjustment parallel with said tracks, a pair of rollers, means mounting each said roller of said pair on said carrier, over and adjacent said ramp and for individual vertical adjustment and for limited adjustment parallel with said tracks, a plurality of rollers, and means mounting said plurality of rollers on said carrier for vertical adjustment as a unit and for horizontal adjustment parallel with said tracks, the axes of rotation of all said rollers being substantially horizontal, said plurality of rollers being horizontally offset from said pair or rollers and adjacent said ramp.

15. As a component for a machine for severing side bands of glass from a ribbon of armored sheet glass traveling in the direction of its length in its own plane, a ramp mounted with its upper planar surface intersecting and diverging upwardly from said plane at an acute angle in said direction, first and second rollers, means mounting said first and second rollers over, adjacent, and in vertical registration with said ramp, a plurality of rollers, and means mounting said plurality of rollers in a common plane offset from the common plane of said ramp and said first and second rollers, the axes of rotation of all said rollers being horizontal.

16. The component of claim 15, said first and second rollers being individually mounted for vertical and horizontal adjustment.

17. The component of claim 16, said second roller being additionally adjustable for pivoting about a vertical axis through its axis of rotation.

18. The method of automatically severing a band of glass from a ribbon of armored glass moving in its own plane in the direction of its length, comprising, breaking the ribbon along a line parallel with said direction and delineating the band to be severed, and progressively moving the broken band out of the plane of the ribbon while positively maintaining the ribbon in its plane, to thereby break the armor connecting the band to the ribbon.

19. The method of automatically severing a band of glass from a ribbon of reinforced glass moving in its own plane in the direction of its length, and having a scored line in a first surface thereof, parallel with said direction, comprising, maintaining said ribbon in its plane of movement while exerting a force on the band at a first station, to break the band along said line, and subsequently at a second station positively moving the band out of said plane by exerting thereon a force normal to said plane to thereby sever the reinforcement holding said band to the ribbon.

20. The method of continuously severing a band of glass from a ribbon of reinforced glass traveling in the direction of its length in its own plane, and having scored in a first surface thereof a line parallel with said direction and delineating the band to be severed, comprising, supporting the ribbon at a first station and on the second surface thereof adjacent said line, while simultaneously at said first station, exerting a first force upon the first surface of the band to break the glass along said line, opening the resulting fissure to tension the reinforcement, supporting the ribbon at a second station downstream from said first station to hold the ribbon in its own plane, and simultaneously at said second station exerting a second force on the band, on the second surface thereof, to positively deflect the band out of the plane of the ribbon and break the reinforcement attaching the band to the ribbon.

21. The method of claim 20, and subsequently deflecting the severed band laterally and away from the ribbon in a direction normal to the plane thereof.

References Cited by the Examiner

UNITED STATES PATENTS

| | | | |
|---|---|---|---|
| 1,895,779 | 1/1933 | Aurien et al. | 225—2 |
| 1,930,582 | 10/1933 | Burdett et al. | 225—96.5 |
| 1,932,149 | 10/1933 | Smith | 225—2 |
| 1,959,545 | 5/1934 | Paxton | 225—2 |

WILLIAM W. DYER, JR., *Primary Examiner.*

J. M. MEISTER, *Assistant Examiner.*